US010611029B2

United States Patent
Johnson et al.

(10) Patent No.: US 10,611,029 B2
(45) Date of Patent: Apr. 7, 2020

(54) ROBOTIC USER INTERFACE PUCK SUPPORT APPARATUS AND METHOD OF USE

(71) Applicant: Walmart Apollo, LLC, Bentonville, AR (US)

(72) Inventors: Christopher D. Johnson, Bentonville, AR (US); Timothy M. Fenton, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 175 days.

(21) Appl. No.: 15/816,786

(22) Filed: Nov. 17, 2017

(65) Prior Publication Data

US 2018/0141214 A1 May 24, 2018

Related U.S. Application Data

(60) Provisional application No. 62/424,672, filed on Nov. 21, 2016.

(51) Int. Cl.
*B25J 9/16* (2006.01)
*G06Q 20/34* (2012.01)

(52) U.S. Cl.
CPC ..... *B25J 9/1679* (2013.01); *G05B 2219/45089* (2013.01); *G06Q 20/34* (2013.01)

(58) Field of Classification Search
CPC ........ B25J 9/1679; G05B 2219/45089; G06Q 20/34
USPC ....................................... 700/218, 231–244
See application file for complete search history.

(56) References Cited

U.S. PATENT DOCUMENTS

| 205,343 | A | | 6/1878 | Bliss |
| 4,369,800 | A | | 1/1983 | Watanabe |
| 4,684,012 | A | | 8/1987 | Feddersen |
| 5,484,052 | A | | 1/1996 | Pawloski |
| 5,700,125 | A | * | 12/1997 | Falace ............... G11B 15/6835 193/44 |
| 6,176,369 | B1 | | 1/2001 | Petrovic |
| 6,698,599 | B1 | | 3/2004 | Hannecke |
| 7,419,042 | B2 | | 9/2008 | Enomoto |

(Continued)

OTHER PUBLICATIONS

APMEX; "Acrylic Display Stand—1 kilo silver Libertad/Aztec Coin"; http://www.apmex.com/product/85480/acrylic-display-stand-1-kilo-silver-libertad-aztec-coin; Available at least as early as Sep. 21, 2016; pp. 1-4.

(Continued)

*Primary Examiner* — Michael Collins
(74) *Attorney, Agent, or Firm* — Fitch, Even, Tabin & Flannery LLP

(57) ABSTRACT

In some embodiments, apparatuses and methods are provided herein useful to test user interfaces of systems. Some embodiments provide a puck support apparatus comprising: a base; a first support and a second support both supported by the base and extending away from the base in generally a first direction; wherein the first support comprises a first channel formed at an angle relative to the first direction; and wherein the second support comprises a second channel formed at the angle relative to the first direction and mirroring the first channel; and wherein the first support at the first channel is separated from the second support by at least a robotic effector threshold distance.

18 Claims, 5 Drawing Sheets

(56) References Cited

U.S. PATENT DOCUMENTS

| | | | | |
|---|---|---|---|---|
| 8,214,078 | B1* | 7/2012 | Sta. Cruz | G07F 11/48 |
| | | | | 221/188 |
| 8,517,808 | B2 | 8/2013 | Chang | |
| 8,882,165 | B2 | 11/2014 | Lipson | |
| 2003/0183589 | A1 | 10/2003 | Kollegian | |
| 2004/0094385 | A1 | 5/2004 | Bybee | |
| 2012/0109369 | A1* | 5/2012 | Paluga | G07F 11/48 |
| | | | | 700/236 |
| 2012/0177473 | A1 | 7/2012 | Smith | |
| 2016/0008983 | A1 | 1/2016 | Osaka | |
| 2017/0015005 | A1* | 1/2017 | Joplin | G06F 19/3462 |

OTHER PUBLICATIONS

Geocache Niagara; "Coin Display Stand"; http://www.geocacheniagara.com/product/coin-display-stand/; Available at least as early as Sep. 21, 2016; pp. 1-7.

PCT; App. No. PCT/US2017/061236; International Search Report and Written Opinion dated Jan. 19, 2018.

Phoenix Challenge Coins; "1.75" Antique silver single coin vertical challenge coin display stand; https://phoenixchallengecoins.com/shop/2-antique-silver-single-coin-vertical-challenge-coin-display-stand/; Available at least as early as Sep. 20, 2016; pp. 1-2.

\* cited by examiner

ROBOTIC USER INTERFACE PUCK SUPPORT APPARATUS AND METHOD OF USE

CROSS-REFERENCE TO RELATED APPLICATION

This application claims the benefit of U.S. Provisional Application No. 62/424,672, filed Nov. 21, 2016, which is incorporated herein by reference in its entirety.

TECHNICAL FIELD

This invention relates generally to supporting a robotic grip puck to enable access to the grip puck.

BACKGROUND

There are many types of retail payment machines. These machines are repeatedly used over time by numerous customers. The reliability and consistency of these machines is critical to customer satisfaction and completing sales. Accordingly, there is a need to ensure the reliability of these machines and their use.

BRIEF DESCRIPTION OF THE DRAWINGS

Disclosed herein are embodiments of systems, apparatuses and methods pertaining supporting a robotic grip puck to enable access to the grip puck. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to support a grippable robotic user interface puck. The support apparatus supports the puck, in some applications, to allow robotic end effectors to readily retrieve and return the puck to the support apparatus. In some embodiments, the robotic user interface puck support apparatus includes a base, a first support and a second support. The first and second supports are both supported by the base and extend away from the base in generally a first direction.

Figure 1:
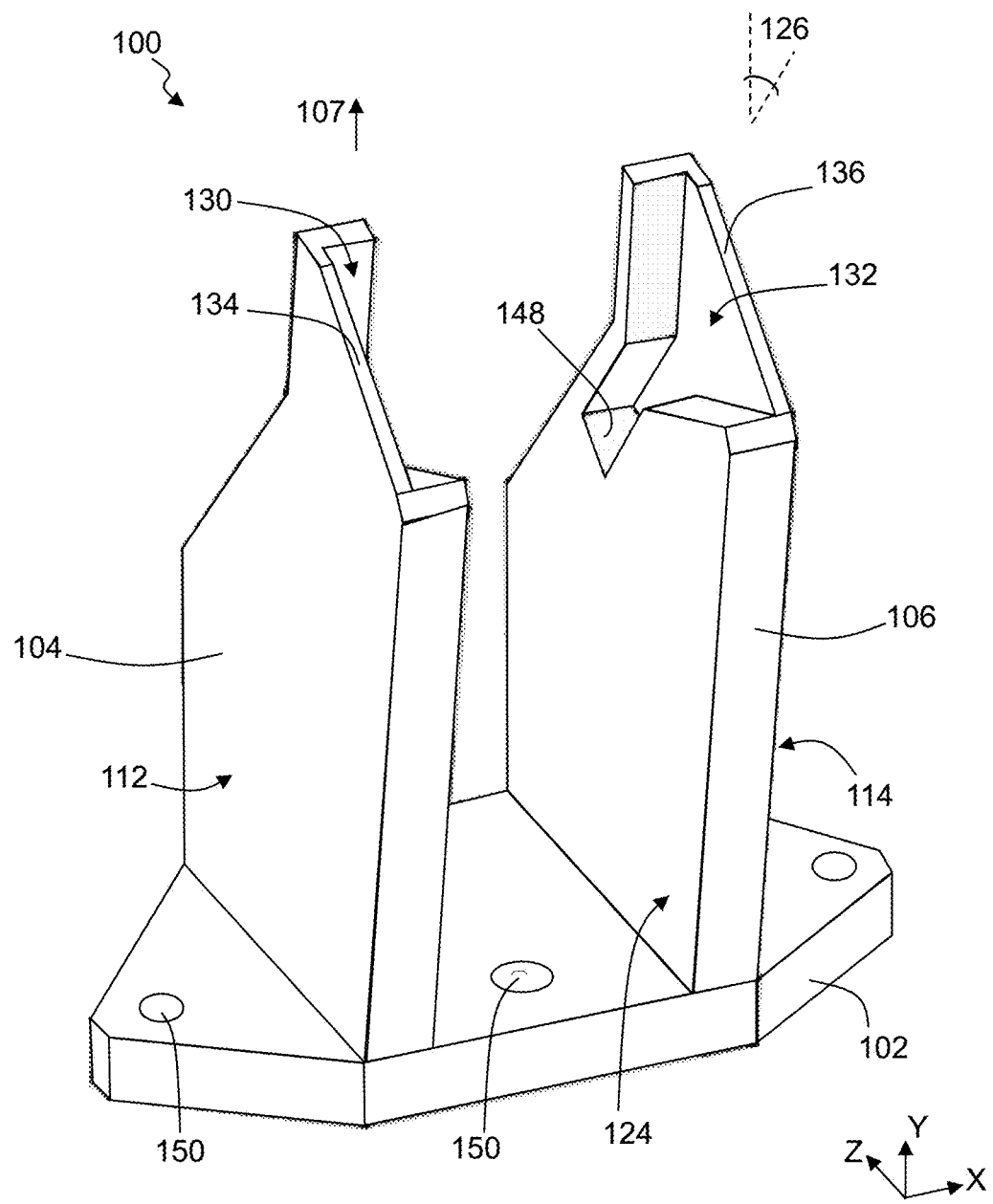
FIG. 1 illustrates a simplified perspective view of an exemplary robotic user interface puck support apparatus, in accordance with some embodiments.

FIG. 1 illustrates a simplified perspective view of an exemplary robotic user interface puck support apparatus 100, in accordance with some embodiments. The interface puck support apparatus includes a base 102 or foundation, a first support 104 and a second support 106. The first and second supports are both supported by the base 102 and extend away from the base along a length of the supports in generally a first direction, illustrated by arrow 107 (also referred to herein generally as a Y axis). In some implementations, the first and second supports extend away from the base at a 90 degree angle, while in other implementations, the supports may extend at some angle other than 90 degrees.

Figure 2:
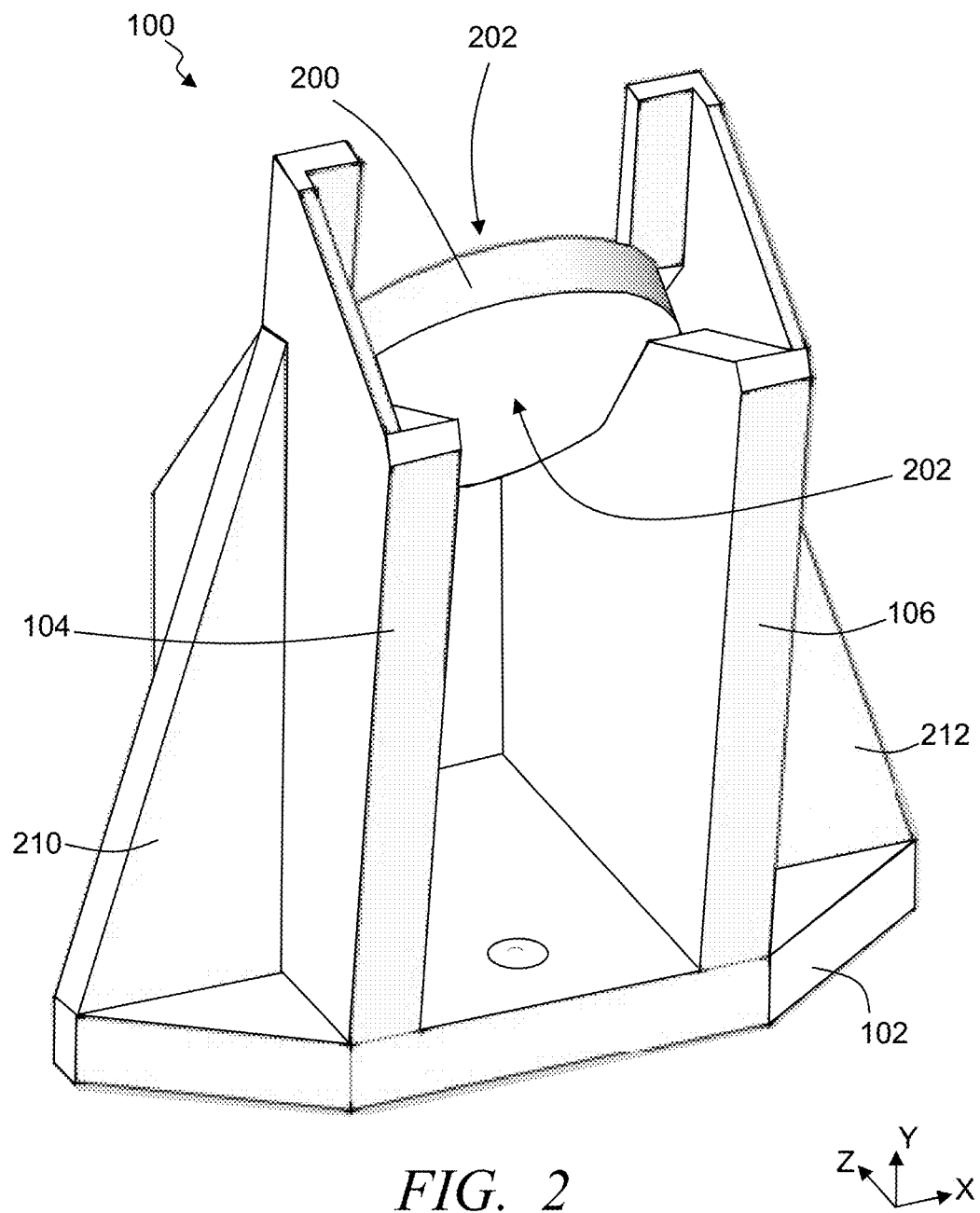
FIG. 2 illustrates a simplified perspective view of another exemplary puck support apparatus supporting an exemplary user interface grip puck, in accordance with some embodiments.

FIG. 2 illustrates a simplified perspective view of another exemplary puck support apparatus 100 supporting an exemplary user interface grip puck 200, in accordance with some embodiments. In this embodiment, the interface puck support apparatus includes a first lateral support 210 and a second lateral support 212. The first lateral support 210 extends from the base 102 and abuts against and/or extends from an exterior surface 112 of the first support 104. Similarly, the second lateral support 212 extends from the base 102 and abuts against and/or extends from an exterior surface 114 of the second support 106. The lateral supports provide lateral support for the respective supports 104, 106.

Figure 3:
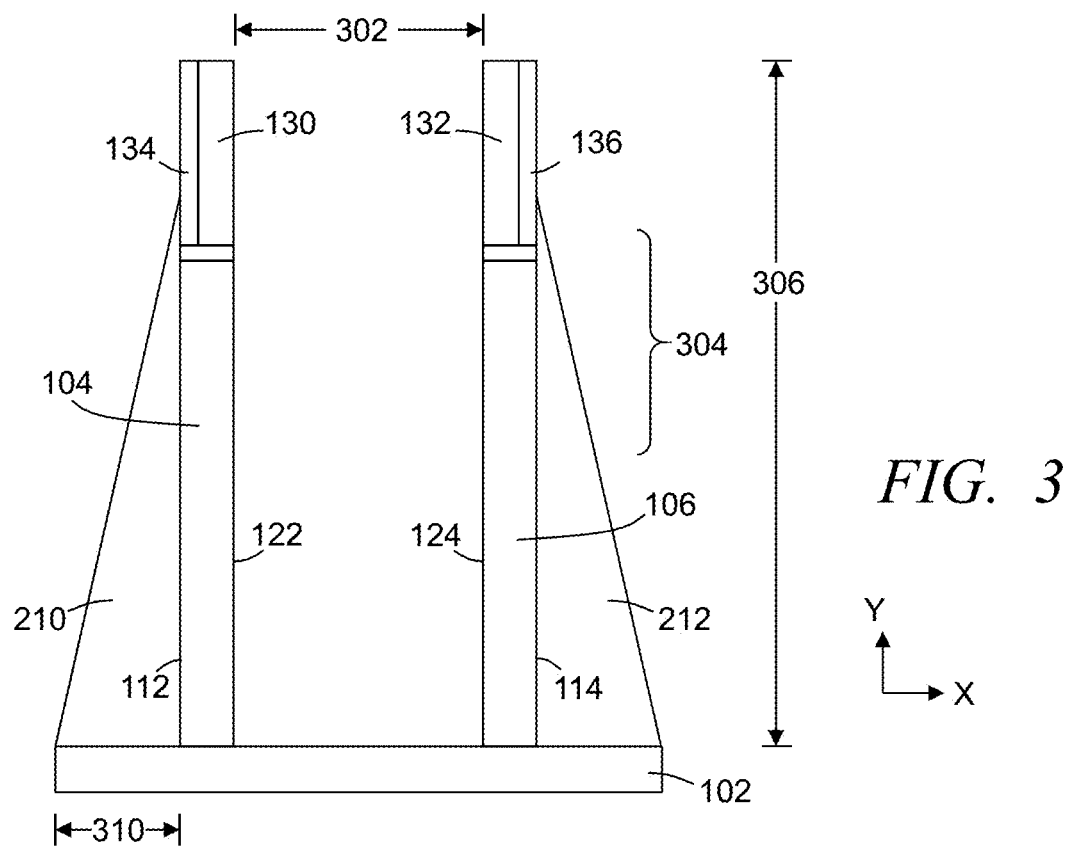
FIG. 3 illustrates a simplified plane view of an exemplary puck support apparatus, in accordance with some embodiments.
Figure 4:
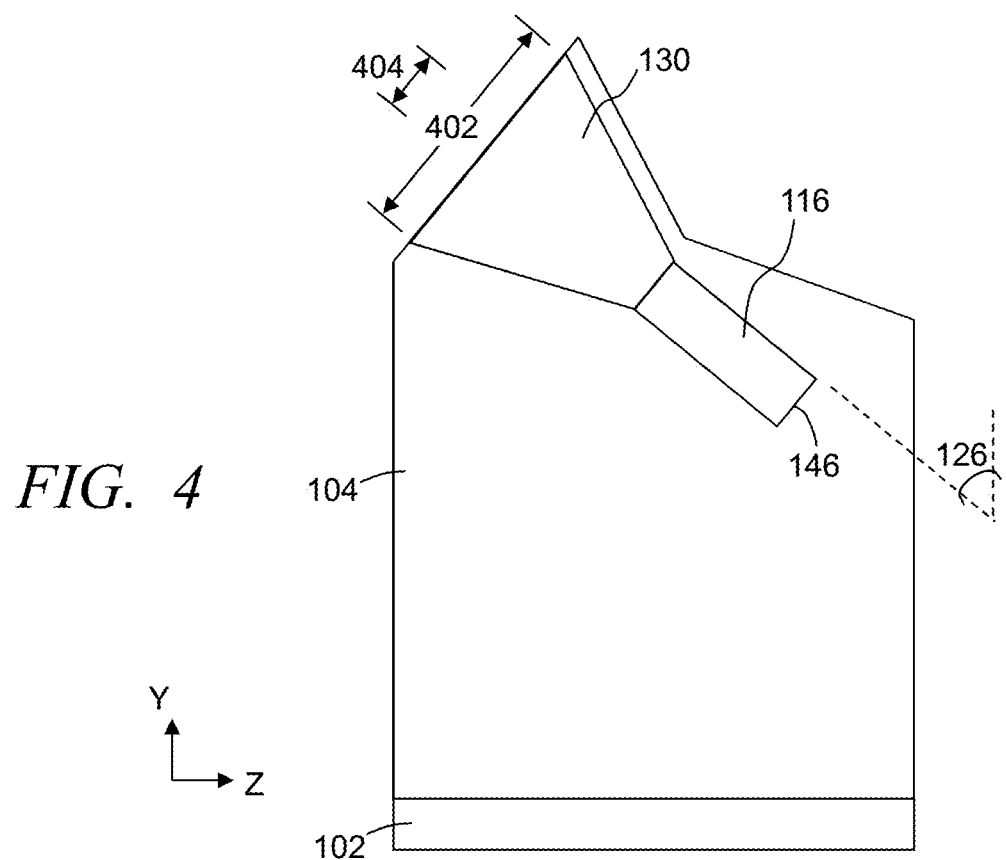
FIG. 4 illustrates a simplified cross-sectional view of an exemplary puck support apparatus, in accordance with some embodiments.

FIG. 3 illustrates a simplified plane view of an exemplary puck support apparatus 100, in accordance with some embodiments. FIG. 4 illustrates a simplified cross-sectional view of an exemplary puck support apparatus 100, in accordance with some embodiments. Referring to FIGS. 1-4, the first support 104 includes a first puck channel 116 (see FIG. 4) formed on an interior surface 122 of the first support, and the second support 106 includes a second puck channel 118 formed on an interior surface 124 of the second support. In some embodiments, the first channel is formed at angles 126 relative to the first direction 107, and the second channel is formed at an angle 126 relative to the first direction and mirroring the first channel. Further, the first and second puck channels are illustrated as recessed into the first and second supports, respectively. The depth of the recess can be substantially any depth and in some instances is dependent on the width of one or more preselected user interface grip pucks. Typically, the first and second channels do not extend through the thickness of the first and second supports, respectively. Accordingly a guide wall or support wall closes the lateral sides of the first and second channels. In other instances, however, the first and second channels may extend through the thickness of the first and second supports. In other implementations, one or more ledges, ridges, or the like may protrude from the interior surfaces 122, 124 and form the channels extending from the interior surfaces.

The first support 104 and the second support are further configured to be separated from each other, at least proximate the first and second channels, by at least a robotic effector threshold distance 302. Accordingly, end effectors of a preselected robot having a width that is less than the effector threshold distance and can fit between the first and second supports at least along a portion of the length of the first and second supports. Further, the first support is separated from the second support by at least the robotic effector threshold distance along at least a depth or threshold portion 304 of a length of the first support between the first channel and the base enabling the end effectors to extend between the first and second supports at least along the threshold portion 304 of the length. In some instances, the first and second supports may be separate along their entire length, which can reduce the amount of material used to construct the puck support apparatus.

In some embodiments, the first channel includes and/or is cooperated with a first funnel opening 130, and the second channel includes and/or is cooperated with a second funnel opening 132. The first support comprises the first funnel opening 130 that is cooperated with and extends from the first channel 116. Similarly, the second support comprises the second funnel opening 132, which may mirror the first funnel opening 130. The second funnel opening is cooperated with and extends from the second channel 118. Further, in some embodiments, the first and second funnel openings are formed as recessed into the first and second supports, respectively. The depth of the recess typically is consistent with the depth of the recessed first and second channels. Based on the depth of the recess, in some embodiments the first funnel opening 130 includes a first lateral guide wall 134 closing the first funnel opening along a side furthest from the second support 106. Similarly, the second funnel opening 132 may include a second lateral guide wall 136 closing the second funnel opening along a side furthest from the first support. The first and second lateral guide walls 134, 136 typically extend along the first and second puck channels 116, 118, respectively, defining the lateral or exterior sides of the puck channels. In other instances, the first and second funnel openings and/or the first and second puck channels may extend through the thickness of the first and second supports, which may allow a portion of the grip puck 200 to extend through one or both of the puck channels, depending on the width of the grip puck and/or placement of the grip puck within the puck support apparatus 100. In other implementations, one or more ledges, ridges, or the like may protrude from the interior surfaces 122, 124 and form the first and second funnel openings extending from the interior surfaces.

In some implementations, the widths 404 of the channels 116, 118, are configured to be minimally larger than the width of expected grip pucks 200 that are expected to be supported by the puck support apparatus 100. For example, in some embodiments, the widths 404 of the channels are 10%, 30% or some other percentage, greater than the expected width 404 of a grip puck 200. By limiting the widths of the channels, the positioning of the grip puck when positioned within the channels is more consistently fixed allowing robotic end effectors to consistently be positioned to grip the grip puck, and return the grip puck.

Further in some embodiments, the widths 402 of the first and second funnel openings 130, 132 generally increase further from the first and second channels, respectively, providing a wider opening at a front area of the first and second supports. Typically, the first and second funnel openings are configured to taper from the front area toward the channel with the width 402 of the funnel openings decreasing to the width 404 of the first and second channels, respectively. The width of the front of the funnel opening can be substantially any relevant width. By providing widths 402 of the funnel openings that are greater than the channel widths 404 enables easier alignment by the robot end effectors to align the grip puck with the funnel openings when returning the grip puck to the puck support apparatus 100, and further provides a margin of error by the robot alignment when returning the grip puck and/or allow for unintended motion of the end effectors (e.g., oscillation resulting from motion of the robot arm). Furthermore, the tapered faces of the funnel openings further acts to guide the grip puck into the puck channels as the robot end effectors return the grip puck, again providing a physical tolerance to compensate for margins of inaccurate alignment by the robot end effectors. In some instances, for example, the width 402 of the funnel openings furthest from the channels 116, 118 is at least twice the width 404 of the channels, and other instances may be at least four times the width 404 of the channels.

The first and second channels 116, 118 further include first and second puck stops 146, 148 that terminate the first and second channels. The first and second puck stops 146, 148 are configured to prevent further movement of the grip puck along the angle of the first and second channels toward the base 102 when the puck is inserted into each of the first channel and the second channel. As introduced above, the angle 126 of the channels can be such to enable gravity to allow the grip puck to slide down into the channels when released by the robotic end effectors or other device or user holding the grip puck and while the grip puck is at least partially extending into the channels (or at least the funnel openings) when released. The puck stops 146, 148 stop a further sliding of the grip puck along the channel and/or maintain a position of the grip puck while positioned in and supported by the channels. In some embodiments, the first and second puck stops 146, 148 are formed by ends of the first and second channels, respectively, which form end walls. Other embodiments may include inserts, ridges, or the like that limit the slide of the grip puck.

As further described above, some embodiments include the lateral guide walls 134, 136. In some embodiments, the lateral guide walls extend along some or all of the length of the channels 116, 118. Accordingly, pucks the first lateral guide wall 134 and the second lateral guide wall 136 can, at least in part and with at least some grip pucks, limit lateral movement (e.g., in the X axis) of the user interface grip puck 200 when inserted to engage each of the first channel 116 and the second channel 118. For example, in some instances, the grip puck is formed with a maximum width that is less than a distance between the exterior surface 112 of the first support 104 and the exterior surface 114 of the second support 106, and typically has a width that is less than a width between the first and lateral guide walls 134, 136. Further, the first and second lateral guide walls may extend along a length of the first and second funnel openings, respectively, and can limit lateral movement of the grip puck when inserted into the funnel openings.

The widths of the first and second supports 104, 106 can depend on the material used to construct the puck support apparatus 100, the expected contact forces of the robot effectors with the supports 104, 106, the size of the grip puck to be supported, and/or other such factors. Similarly, in some embodiments, the puck support apparatus includes the first and second lateral supports 210, 212 providing additional structural integrity and durability to the puck support apparatus and the first and second supports, which can allow the thickness of the first and second supports to be reduced depending on the amount of structural rigidity and stability the lateral supports provide. The lateral supports 210, 212 are illustrated in FIG. 2 as tapering in width 310 along a length and gradually increasing in thickness closer to the base (e.g., along the X axis). The degree of taper can depend on the desired lateral support to be provided and/or the quantity of material used in manufacturing the puck support apparatus. The lateral supports do not have to taper, and in some instances, may be of a constant thickness.

Further, the puck support apparatus 100 can be constructed from substantially any relevant material having the structural integrity to receive and support the grip puck. For example, the puck support apparatus may be constructed from polylactic acid (PLA), Acrylonitrile butadiene styrene (ABS), plastics, carbon fiber impregnated PLA, rubber, silicon, aluminum, steel, other metals, other such materials, or combination of two or more of such materials. In some instances, some or all of the puck support apparatus may be formed from layering of materials cooperatively forming the portions or all of the puck support apparatus. Further, in some embodiments, the puck support apparatus or portions of the puck support apparatus can be formed through three-dimensional (3D) printing processes. In other implementations, the puck support apparatus or portions of the support apparatus may be manufactured through injection molding, machining, other such methods, or combination of two or more of such methods.

Similarly, the grip puck 200 may be constructed from polylactic acid (PLA), Acrylonitrile butadiene styrene (ABS), plastics, carbon fiber impregnated PLA, rubber, silicon, aluminum, steel, other metals, other such materials, or combination of two or more of such materials. In some instances, the grip puck is configured to induce a capacitive effect when the end effector is interacting with a touch screen of a system being tested. Further, the grip puck may be 3D printed, formed through injection molding, tooling, other such methods of assembly, or combination of two or more of such methods. In some embodiments, one or both of the effector grip areas 202 of the grip puck are formed with dimples, bumps, texturing, contouring, protrusions, ribs, ridges, channels, other such surface variations and/or irregularities, or combinations of two or more of such surface variations. The surface variations can enhance the end effector's ability to grip and maintain a desired position of the grip puck within the end effectors when clamped by the end effectors.

The grip puck 200 can be formed in generally a disk shape. The diameter of the circular disk is dependent on the size of the robotic end effectors expected to grip the grip puck. The circular perimeter further allows the grip puck to free from orientation restrictions. Accordingly, the grip puck can be inserted into the puck support apparatus 100 without concern for an orientation of the grip puck. Further, the circular perimeter shape allows for a margin of error of alignment the end effectors with the grip support apparatus. It is noted, however, that the grip puck can be formed in other shapes, such as but not limited to pentagon shaped, hexagon shaped, triangular shaped, square shaped, rectangular shaped, and/or other shapes that can be gripped by robotic end effectors.

Figure 5:
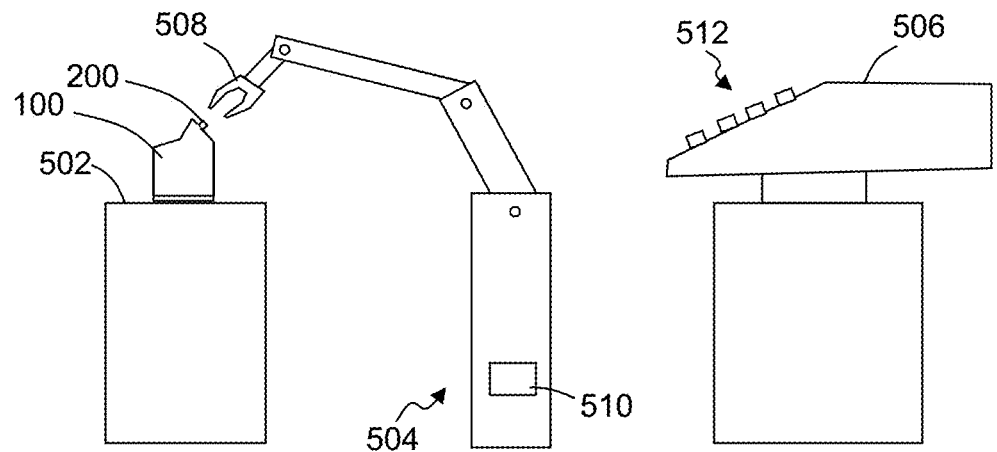
FIG. 5 illustrates a simplified block diagram of a puck support apparatus secured with a surface, and positioned proximate a testing robot system, in accordance with some embodiments.

In some embodiments, the base 102 includes one or more mounting apertures 150 configured to receive a fixture to fix the base and first and second supports in a position. Accordingly, the puck support apparatus 100 can be secured with a surface to fix the puck support apparatus in place relative to a position of a testing robot system and the robotic end effectors. FIG. 5 illustrates a simplified block diagram of a puck support apparatus 100 secured with a surface 502, and positioned proximate a testing robot system 504, such as a card payment testing robot system, in accordance with some embodiments. A card payment system 506 to be tested can similarly be positioned adjacent the testing robot system. In operation, the testing robot system can control the robotic end effectors 508 and position the end effectors on opposite sides of the grip puck 200, and typically extending between the first and second supports. The end effectors can be activated to clamp the grip puck, retract the grip puck from the puck support apparatus 100, and then be moved to a location adjacent to the card payment system 506. The test robot 504 includes one or more robot control systems 510 that controls at least the end effectors 508. Additionally or alternatively, the test robot is in wired and/or wireless communication with a remote control system that provides at least some control and/or programming to the robot control system. The test robot can, for example, be controlled to interact with the user interface 512 of the card payment system, such as to repeatedly interact with a touch screen, press one or more buttons, and/or other such interactions. By gripping the grip puck, the end effectors are in a desired closed position reducing profile of the end effectors allowing the end effectors to more readily contact just those buttons or other aspects of the card payment system being tested. Because the testing is automated through the robot system, the card payment system can be tested for an extended period of time, and/or repeatedly tested multiple different times. The robot can return the grip puck 200 to the puck support apparatus 100 when testing is complete, when the end effectors are to interact with one or more other devices (e.g., grip a test payment card, grip a stylus, etc.).

The first and second puck channels 116, 118 maintain the grip puck in a known fixed position allowing the robot system to repeatedly and easily retrieve the grip puck. Similarly, the first and second funnel openings 130, 132 allow the robot to readily return the grip puck 200 to the puck support apparatus 100, even when misaligned within a threshold misalignment, which is relatively large due to the relatively large funnel openings relative to the width of the puck channels. As illustrated in FIG. 2, in some embodiments the user interface grip puck 200 is configured to be positioned with portions of the grip puck extending into each of the first channel 116 and the second channel 118. The grip puck, when positioned within the channels, is temporarily supported by the first and second channels and is further positioned with effector grip areas 202 of the grip puck (e.g., top and bottom circular shaped surfaces of a disk shaped grip puck) are exposed between the first support 104 and the second support 106. Again, the first support 104 and the second support 106 are separated, at least proximate the puck channels, by the effector threshold distance 302. The separation allows the end effectors 508 to be positioned on opposite sides of the grip puck while at least a portion of the end effectors extend between the first and second supports. Further, the angle 126 of the puck channels can be configured based on a natural orientation of the end effectors to simplify the insertion of the end effectors between the first and second supports and along the faces of the grip puck, and retraction of the end effectors away from the grip puck. By maintaining the precise positioning of the grip puck and simplifying the replacing of the grip puck, the puck support assembly enables a high degree of repeatability to the cooperation, retrieval and return of the grip puck by the robotic end effectors.

Figure 6:
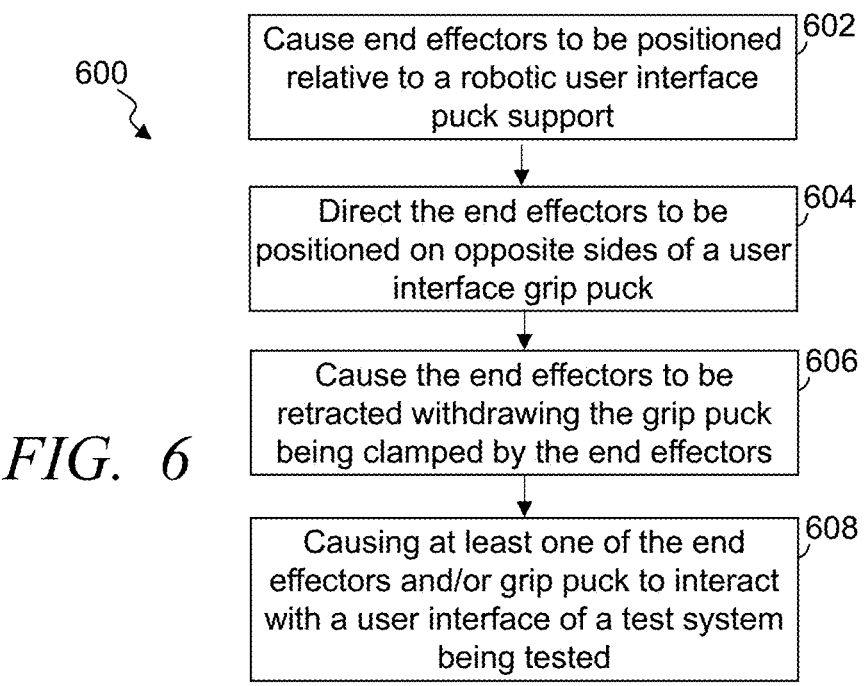
FIG. 6 illustrates a simplified flow diagram of an exemplary process of testing a user interface of an electronic system, in accordance with some embodiments.

FIG. 6 illustrates a simplified flow diagram of an exemplary process 600 of testing a user interface of an electronic system, in accordance with some embodiments. In step 602, end effectors are caused to be positioned relative to a robotic user interface puck support apparatus 100. In step 604, the end effectors are directed to be positioned on opposite sides of a user interface grip puck 200 supported by the first channel 116 and the second channel 118 of the puck support apparatus, and the end effectors are activated to clamp the grip puck. Again, the first channel is formed in the first support 104 and the second channel is formed in the second support 106, with the second channel being positioned opposite to and mirroring the first channel. In step 606, the end effectors are caused to be retracted withdrawing the grip puck 200 being clamped by the end effectors. In step 608, at least one of the end effectors, while clamping the grip puck, and/or the grip puck is caused to interact with a user interface of a test system (e.g., card payment system 506) being tested.

Some embodiments, in causing the end effectors to be retracted retract the grip puck 200 generally parallel with the angle 126 of the first and second channels 116, 118. In some embodiments, the first and second channels are formed at the angle relative to the base 102 from which the first support 104 and the second support 106 extend. In directing the end effectors to be positioned on opposite sides of the grip puck, some embodiments cause the end effectors to extend between the first support and the second support that are separated by at least the robotic effector threshold distance 302.

Further, some embodiments direct the end effectors to insert portions of the grip puck (e.g., portions on opposite sides of the grip puck) into both the first funnel opening 130 cooperated with and extending from the first channel 116 and a second funnel opening 132 cooperated with and extending from the second channel 118. The widths 402 of the first and second funnel openings generally increase further from the first and second channels, respectively. The end effectors can be activated to release the grip puck 200 such that the portions of the grip puck are maintained in first channel and the second channel temporarily supporting the grip puck. In some instances, the activation of the end effectors to release the grip puck includes releasing the grip puck such that the grip puck drops along the first and second channels and is stopped by the first and second puck stops 146, 148 of the first and second channels, respectively. In inserting the portions of the grip puck into the first and second funnel openings 130, 132, some embodiments cause the end effectors to extend between the first support 104 and the second support 106, with the first and second supports being separated by at least a robotic effector threshold distance 302 that extends a threshold depth of a length 304 of the first and second supports between the channels and the base 102.

Figure 7:
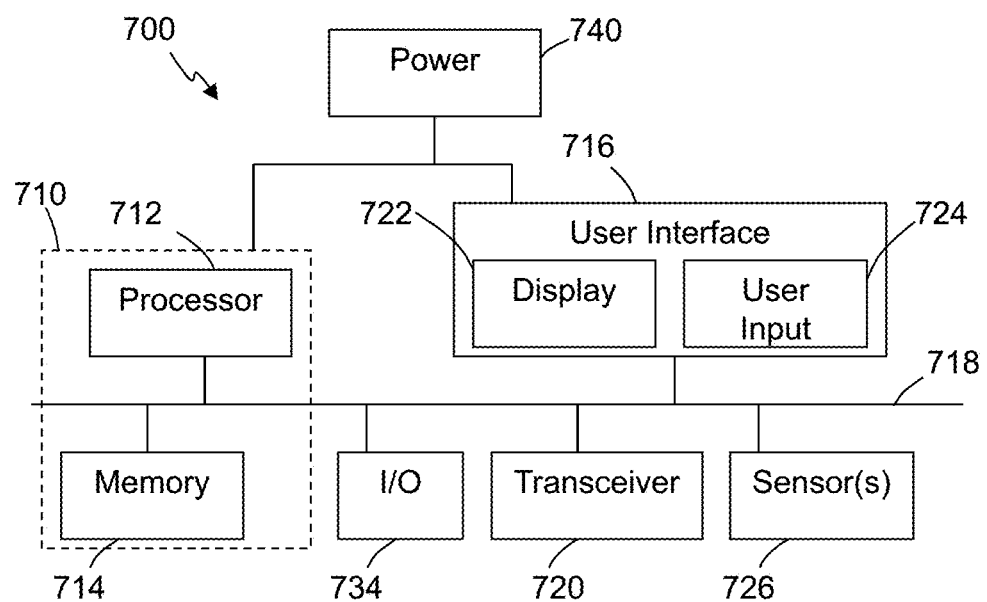
FIG. 7 illustrates an exemplary system for use in implementing methods, techniques, devices, apparatuses, systems, servers, sources and testing user interfaces of systems, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 7 illustrates an exemplary system 700 that may be used for implementing any of the components, circuits, circuitry, systems, functionality, apparatuses, processes, or devices of the testing robot system 504, one or more remote testing control systems in communication with the testing robot system, and/or other above or below mentioned systems or devices, or parts of such circuits, circuitry, functionality, systems, apparatuses, processes, or devices. For example, the system 700 may be used to implement some or all of the robot control system 510, remote robot control system, and/or other such components, circuitry, functionality and/or devices. However, the use of the system 700 or any portion thereof is certainly not required.

By way of example, the system 700 may comprise a control circuit or processor module 712, memory 714, and one or more communication links, paths, buses or the like 718. Some embodiments may include one or more user interfaces 716, and/or one or more internal and/or external power sources or supplies 740. The control circuit 712 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 712 can be part of control circuitry and/or a control system 710, which may be implemented through one or more processors with access to one or more memory 714 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 700 may be used to implement one or more of the above or below, or parts of, components, circuits, systems, processes and the like. For example, the system may implement the robot control systems 510 with the control circuit being a robot control circuit, or other components.

The user interface 716 can allow a user to interact with the system 700 and receive information through the system. In some instances, the user interface 716 includes a display 722 and/or one or more user inputs 724, such as buttons, touch screen, track ball, keyboard, mouse, etc., which can be part of or wired or wirelessly coupled with the system 700. Typically, the system 700 further includes one or more communication interfaces, ports, transceivers 720 and the like allowing the system 700 to communicate over a communication bus, a wired and/or wireless distributed computer and/or communication network (e.g., a local area network (LAN), the Internet, wide area network (WAN), etc.), communication link 718, other networks or communication channels with other devices and/or other such communications or combination of two or more of such communication methods. Further the transceiver 720 can be configured for wired, wireless, optical, fiber optical cable, satellite, or other such communication configurations or combinations of two or more of such communications. Some embodiments include one or more input/output (I/O) ports 734 that allow one or more devices to couple with the system 700. The I/O ports can be substantially any relevant port or combinations of ports, such as but not limited to USB, Ethernet, or other such ports. The I/O interface 734 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 726 to provide information to the system and/or sensor information that is communicated to another component, such as a central control system. The sensors can include substantially any relevant sensor, such as distance measurement sensors (e.g., optical units, sound/ultrasound units, etc.), applied forces, end effector clamping force, inertial sensors, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 700 comprises an example of a control and/or processor-based system with the control circuit 712. Again, the control circuit 712 can be implemented through one or more processors, controllers, central processing units, logic, software and the like. Further, in some implementations the control circuit 712 may provide multiprocessor functionality.

The memory 714, which can be accessed by the control circuit 712, typically includes one or more processor readable and/or computer readable media accessed by at least the control circuit 712, and can include volatile and/or nonvolatile media, such as RAM, ROM, EEPROM, flash memory and/or other memory technology. Further, the memory 714 is shown as internal to the control system 710; however, the memory 714 can be internal, external or a combination of internal and external memory. Similarly, some or all of the memory 714 can be internal, external or a combination of internal and external memory of the control circuit 712. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over a computer network (e.g., LAN, WAN, Internet, etc.). The memory 714 can store code, software, executables, scripts, data, content, lists, programming, programs, log or history data, user information, and the like. While FIG. 7 illustrates the various components being coupled together via a bus, it is understood that the various components may actually be coupled to the control circuit and/or one or more other components directly.

In some embodiments, a puck support apparatus is provided that comprises: a base; a first support and a second support both supported by the base and extending away from the base in generally a first direction; wherein the first support comprises a first channel formed at an angle relative to the first direction; and wherein the second support comprises a second channel formed at the angle relative to the first direction and mirroring the first channel; and wherein the first support at the first channel is separated from the second support by at least a robotic effector threshold distance.

Some embodiments provide methods of testing a user interface of an electronic system, the method comprising: causing end effectors to be positioned relative to a robotic user interface puck support; directing the end effectors to be positioned on opposite sides of a user interface grip puck supported by a first channel and a second channel of the robotic user interface puck support and activating the end effectors to clamp the grip puck, wherein the first channel is formed in a first support and the second channel is formed in a second support and positioned opposite to and mirroring the first channel; causing the end effectors to be retracted withdrawing the grip puck being clamped by the end effectors; and causing at least one of the end effectors while clamping the grip puck to interact with a user interface of a test system being tested.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A robotic user interface puck support apparatus, comprising:
    a base;
    a first support and a second support both supported by the base and extending away from the base in generally a first direction;
    wherein the first support comprises a first channel formed at an angle relative to the first direction; and
    wherein the second support comprises a second channel formed at the angle relative to the first direction and mirroring the first channel;
    wherein the first support at the first channel is separated from the second support by at least a robotic effector threshold distance;
    wherein the first support further comprises a first funnel opening cooperated with and extending from the first channel wherein a width of the first funnel opening generally increases further from the first channel; and
    wherein the second support further comprises a second funnel opening mirroring the first funnel opening and cooperated with and extending from the second channel wherein a width of the second funnel opening generally increases further from the second channel.

2. The apparatus of claim 1, wherein the width of the first funnel opening furthest from the first channel is at least twice a width of the first channel, and the width of the second funnel opening furthest from the second channel is at least twice a width of the second channel.

3. The apparatus of claim 1, wherein the first channel comprises a first puck stop, and the second channel comprise a second puck stop, wherein the first puck stop and the second puck stop are configured to prevent further movement of a user interface grip puck along the angle relative to the first direction of the first and second channels toward the base when inserted into each of the first channel and the second channel.

4. The apparatus of claim 3, wherein the first channel, the second channel, the first stop and the second stop cooperatively maintain the user interface grip puck, to be inserted into and supported by the first channel and the second channel, in a known fixed position.

5. The apparatus of claim 1, wherein the first funnel opening comprises a first lateral guide wall closing the first funnel opening along a side furthest from the second support, and the second funnel opening comprises a second lateral guide wall closing the second funnel opening along a side furthest from the first support, wherein the first lateral guide wall and the second lateral guide wall are configured to limit lateral movement of a user interface grip puck when inserted to engage each of the first channel and the second channel.

6. The apparatus of claim 1, wherein the first support is separated from the second support by at least the robotic effector threshold distance along at least a portion of a length of the first support between the first channel and the base.

7. The apparatus of claim 1, further comprising:
a user interface grip puck configured to be positioned with portions of the grip puck extending into each of the first channel and the second channel and temporarily supported by the first channel and the second channel while an effector grip area of the grip puck is exposed between the first support and the second support.

8. The apparatus of claim 7, wherein the first support comprises a first exterior surface, and the second support comprises a second exterior surface wherein a maximum width of the grip puck is less than a distance between the first exterior surface and the second exterior surface.

9. The apparatus of claim 1, wherein the base comprises at least one mounting aperture configured to receive a fixture to fix the base and first and second supports in a position.

10. The apparatus of claim 1, wherein the angle relative to the first direction of the first channel and the second channel is configured to enable a user interface grip puck to slide down, based on gravity, into the channels when the user interface grip puck is released.

11. The apparatus of claim 10, wherein the first channel comprises a first puck stop, and the second channel comprise a second puck stop, wherein the first puck stop and the second puck stop are configured to prevent further sliding of the user interface grip puck along the first and second channels and maintain a position of the grip puck while positioned in and supported by the first and second channels.

12. The apparatus of claim 11, wherein the first channel, the second channel, the first stop and the second stop cooperatively maintain the user interface grip puck, to be inserted into and supported by the first channel and the second channel, in a known fixed position.

13. The apparatus of claim 1, further comprising a first lateral support extending from the base and an exterior surface of the first support, and a second lateral support extending from the base and an exterior surface of the second support.

14. A method of testing a user interface of an electronic system, the method comprising:
causing end effectors to be positioned relative to a robotic user interface puck support;
directing the end effectors to be positioned on opposite sides of a user interface grip puck supported by a first channel and a second channel of the robotic user interface puck support and activating the end effectors to clamp the grip puck, wherein the first channel is formed in a first support and the second channel is formed in a second support and positioned opposite to and mirroring the first channel;
causing the end effectors to be retracted withdrawing the grip puck being clamped by the end effectors;
causing at least one of the end effectors while clamping the grip puck to interact with a user interface of a test system being tested;
directing the end effectors to insert portions of the grip puck into both a first funnel opening cooperated with and extending from the first channel and a second funnel opening cooperated with and extending from the second channel wherein a widths of the first funnel opening and the second funnel opening generally increase further from the first channel and the second channel, respectively; and
activating the end effectors to release the grip puck such that the portions of the grip puck are maintained in first channel and the second channel temporarily supporting the grip puck.

15. The method of claim 14, wherein the causing the end effectors to be retracted comprises retracting the grip puck generally parallel with an angle of the first and second channels, wherein the first and second channels are formed at the angle relative to a base from which the first support and the second support extend.

16. The method of claim 15, wherein the directing the end effectors to be positioned on opposite sides of the grip puck comprises causing the end effectors to extend between the first support and the second support that are separated by at least a robotic effector threshold distance.

17. The method of claim 14, wherein the activating the end effectors to release the grip puck comprises releasing the grip puck such that the grip puck drops along the first channel and the second channel and is stopped by a first puck stop of the first channel and a second puck stop of the second channel.

18. The method of claim 17, wherein the directing the end effectors to insert the portions of the grip puck into the first funnel opening and the second funnel opening comprises causing the end effectors to extend between the first support and the second support.

\* \* \* \* \*